United States Patent [19]
Clark et al.

[11] Patent Number: 6,121,958
[45] Date of Patent: Sep. 19, 2000

[54] COMMUNICATIONS APPARATUS WITH A FIXED KEYPAD DEVICE AND A RETRACTABLE KEYPAD DEVICE

[75] Inventors: Mary C. Clark, Memphis; Jeffrey S. Raquet, Bartlett; Kazuki Ohashi, Cordova, all of Tenn.

[73] Assignee: Brother International Corporation, Bridgewater, N.J.

[21] Appl. No.: 09/137,751

[22] Filed: Aug. 21, 1998

[51] Int. Cl.[7] .............................. G09G 5/00; H05K 5/00
[52] U.S. Cl. ..................... 345/168; 361/680; 361/681; 361/683
[58] Field of Search .................................. 345/168, 173, 345/905; 439/165; 361/680, 681, 683; 364/708; 455/186; 341/22, 23

[56] References Cited

U.S. PATENT DOCUMENTS

| 4,533,791 | 8/1985 | Read et al. ............................. 179/2 R |
| 4,926,010 | 5/1990 | Citron ..................................... 178/18 |
| 5,481,430 | 1/1996 | Miyagawa et al. ..................... 361/681 |
| 5,589,849 | 12/1996 | Ditzik ..................................... 345/126 |
| 5,661,641 | 8/1997 | Shindo .................................... 361/814 |
| 5,825,617 | 10/1998 | Kochis et al. .......................... 361/686 |
| 5,877,746 | 3/1999 | Parks et al. ............................. 345/156 |

*Primary Examiner*—Matthew Luu
*Assistant Examiner*—Cutler J Blackman
*Attorney, Agent, or Firm*—Oliff & Berridge, PLC

[57] ABSTRACT

A communications apparatus has a housing and a display and includes a first keypad device and a second keypad device. The first keypad device is immovably disposed relative to the housing and the display. The second keypad device is operative for moving to and between an exposed state and a retracted state. When the second keypad device is in the exposed state, the first keypad device is covered by the second keypad device so that the second keypad device is accessible to a user while the first keypad device is inaccessible to the user. When the second keypad device is in the retracted state, the second keypad device is stowed within the housing and the first keypad device is uncovered such that the second keypad device is inaccessible to the user while the first keypad device is accessible to the user.

15 Claims, 14 Drawing Sheets

2

COMMUNICATIONS APPARATUS WITH A FIXED KEYPAD DEVICE AND A RETRACTABLE KEYPAD DEVICE

BACKGROUND OF THE INVENTION

1. Field of Invention

The invention is directed to a communications apparatus having a display, a telephone handset unit and two computer keypad devices. More particularly, the invention is directed to a communications apparatus that includes a fixed keypad device and a retractable keypad device.

2. Description of Related Art

A conventional communications device 2 is shown in FIGS. 1A and 1B. The conventional communications device 2 includes a display 4, a telephone handset unit 6, a first grouping of keypads 8 and a second grouping of keypads 10. The first grouping of keypads 8 includes a 12-key telephone keypad and is fixed in a stationary condition on a housing 12. The second grouping of keypads 10 is a standard computer keypad arrangement and is incorporated into a console 14.

As shown in FIG. 1A, the console 14 with the second grouping of keypads 10 is partially stowed within and is partially retracted from the housing 12. In FIG. 1B, the console 14 with the second grouping of keypads 10 is completely retracted from the housing 12 so that a user has access to both the first grouping of keypads 8 as well as the second grouping of keypads 10.

A problem associated with the conventional communication device 2 is that when the console 14 is completely retracted from the housing 12 to provide access to the second grouping of the keypads 10 to a user, additional support is required under the console 14. Thus, a support surface area underneath the conventional communications device 2 must be increased to facilitate use of the second grouping of keypads 10. If, for example, the conventional communications device 2 is placed on a small stand, it is possible that the support surface area of the small stand is insufficient to support the console 14. As a result, the conventional communications device 2 must be moved to another flat horizontal support structure with adequate surface area so that the user can use the second grouping of the keypads 10.

Additionally, the conventional communications device 2 is designed to be placed on a flat horizontal surface. The design of the conventional communications device 2 cannot accommodate mounting onto a vertical support surface.

The invention resolves these problems.

SUMMARY OF THE INVENTION

A communications apparatus of the invention has a housing and a display and includes a first keypad device and a second keypad device. The first keypad device is immovably disposed relative to the housing and the display. The second keypad device is operative for moving to and between an exposed state and a retracted state. When the second keypad device is in the exposed state, the first keypad device is covered by the second keypad device so that the second keypad device is accessible to a user while the first keypad device is inaccessible to the user. When the second keypad device is in the retracted state, the second keypad device is stowed within the housing and the first keypad device is uncovered such that the second keypad device is inaccessible to the user while the first keypad device is accessible to the user.

BRIEF DESCRIPTION OF THE DRAWINGS

Other features of the invention will become apparent as the following descriptions proceeds and upon reference to the drawings in which.

DETAILED DESCRIPTION OF PREFERRED EMBODIMENTS

Figure 1A:
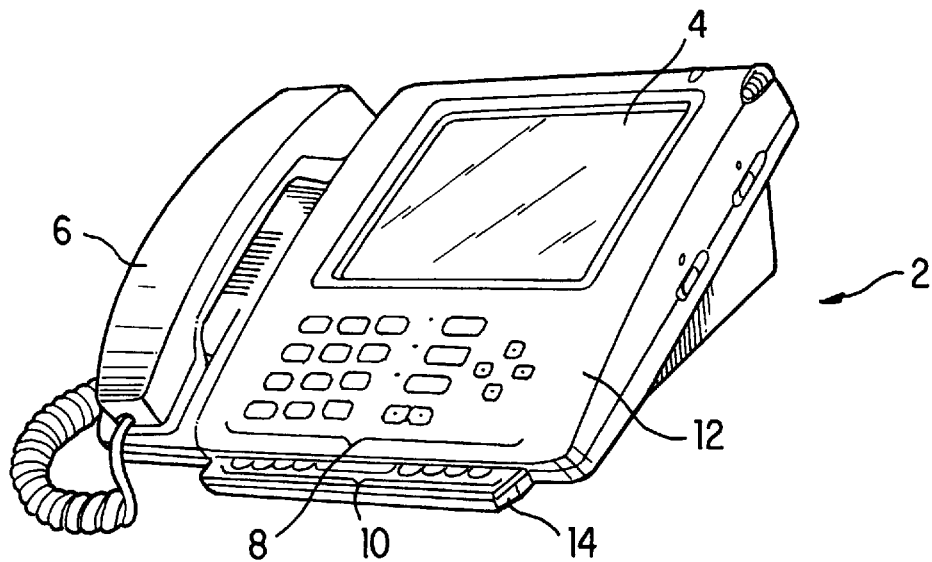
FIG. 1A is a perspective view of a conventional communications device having a first grouping of keypads mounted in a housing and a second grouping of keypads mounted in a retractable console.
Figure 1B:
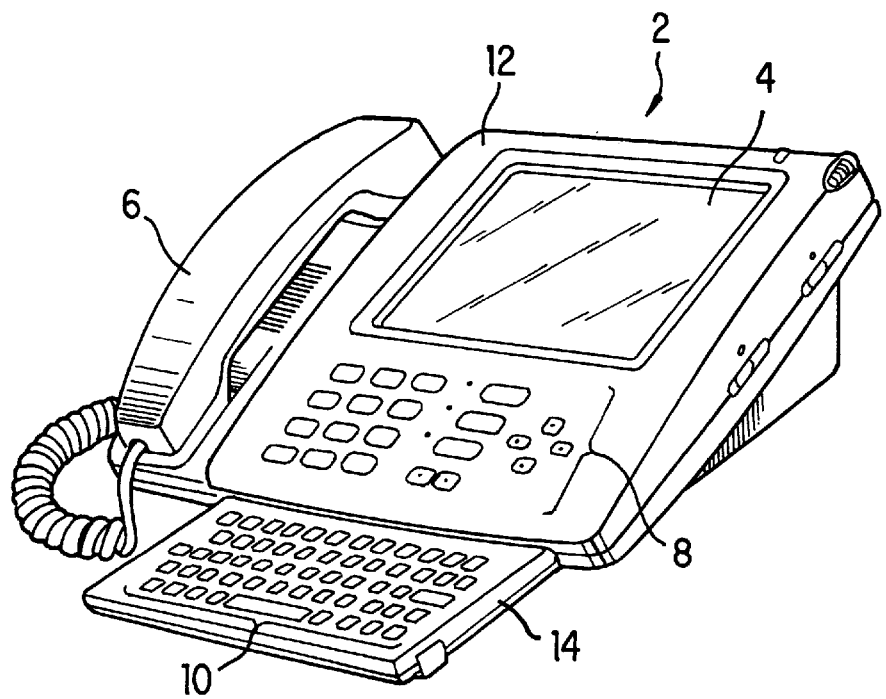
FIG. 1B is a perspective view of the conventional communications device in FIG. 1 with the console pulled out from the housing.
Figure 2:
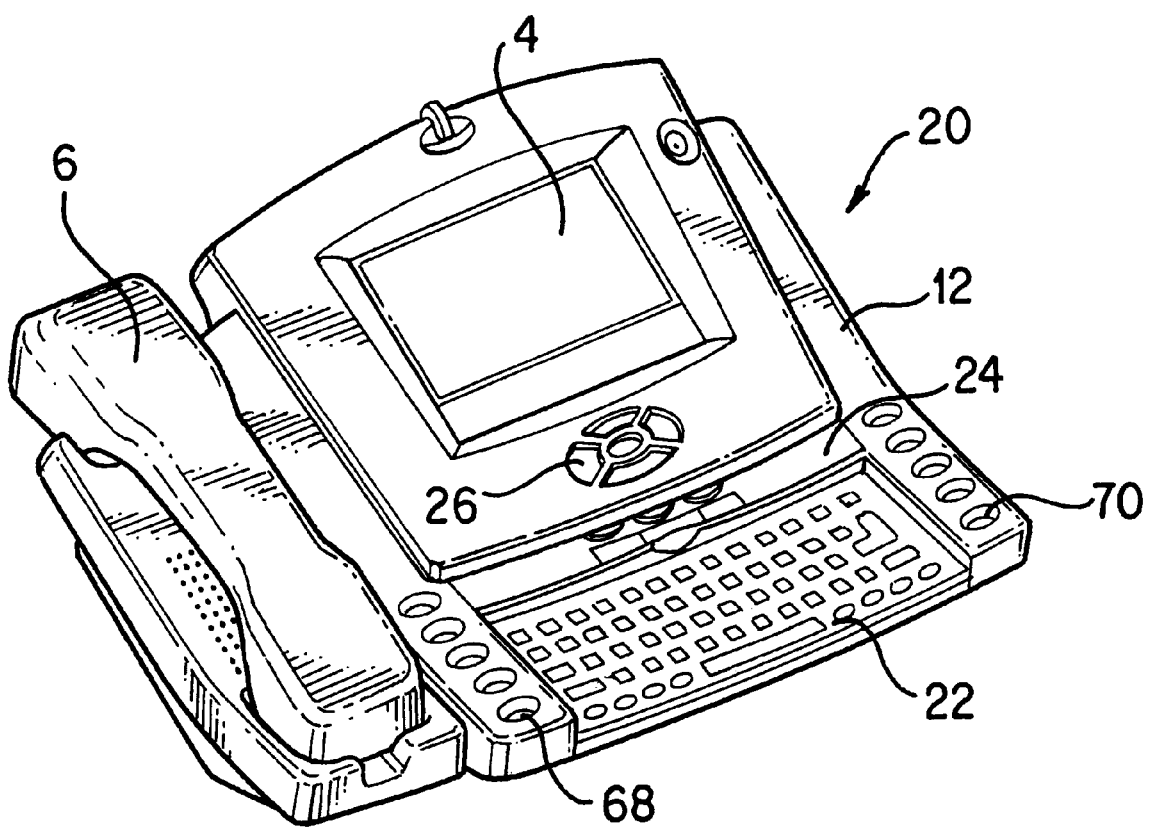
FIG. 2 is a perspective view of a communications apparatus of the invention with an immovable first keypad device accessible to a user.
Figure 3:
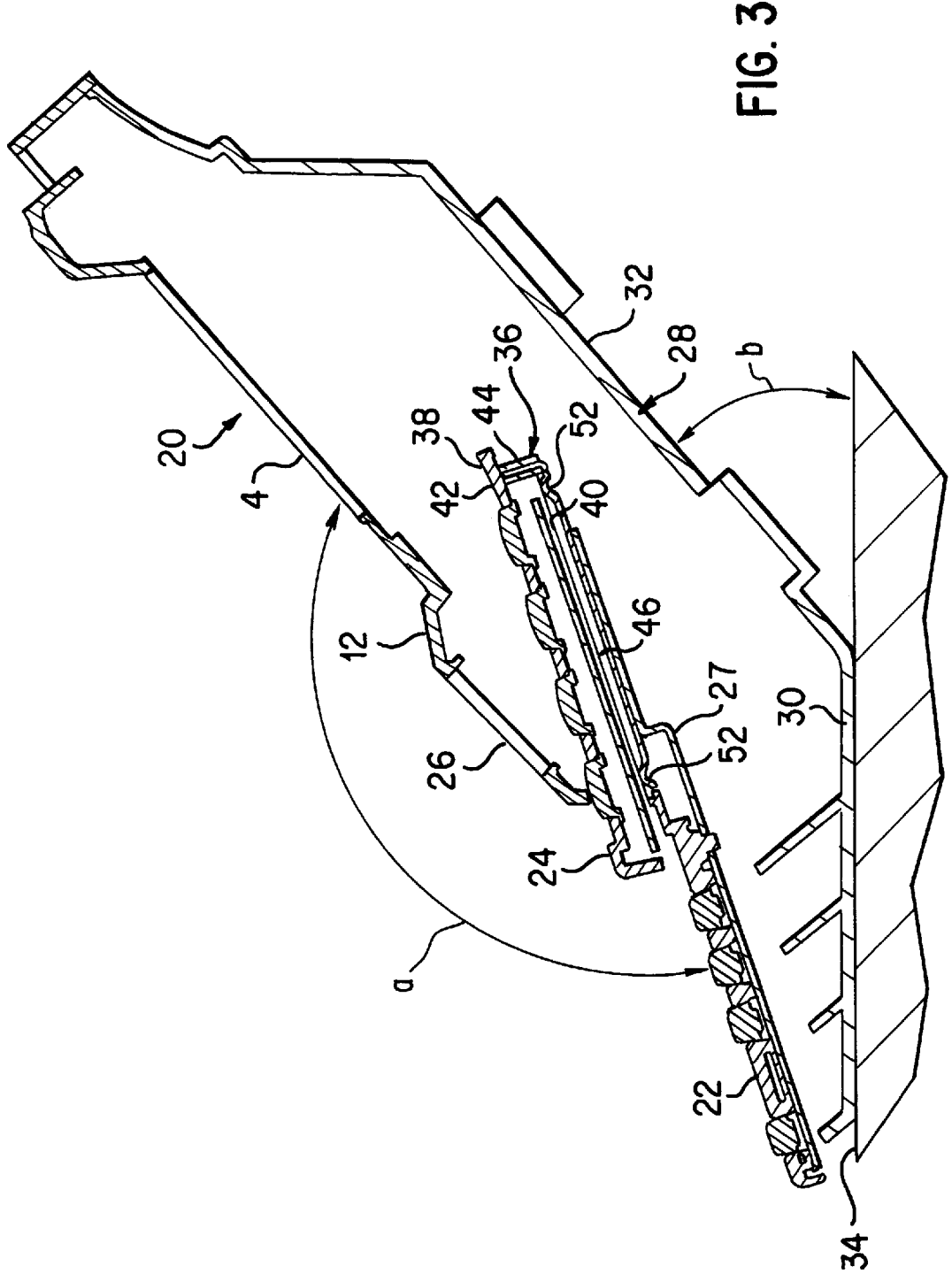
FIG. 3 is a cross-sectional elevational view of the communications apparatus of the invention in FIG. 2 showing a second keypad device in a retracted state.
Figure 4:
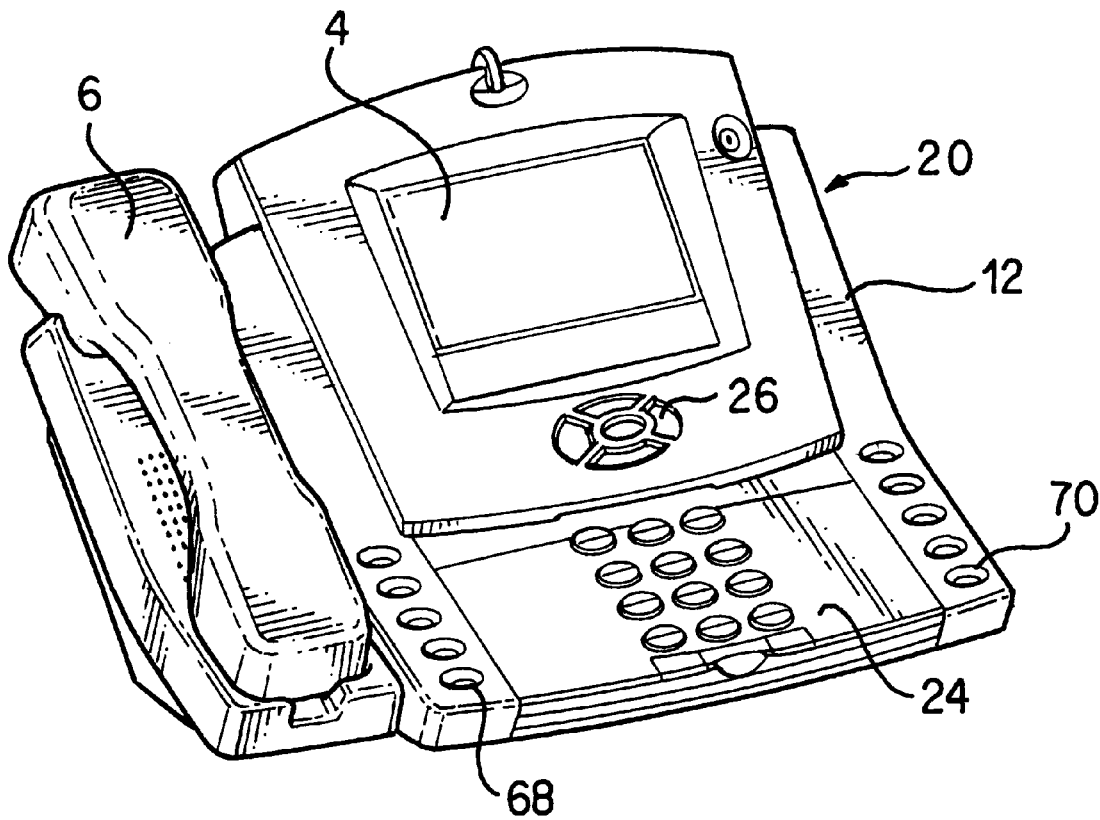
FIG. 4 is a perspective view of the communications apparatus of the invention illustrating the second keypad device in an exposed state.
Figure 5:
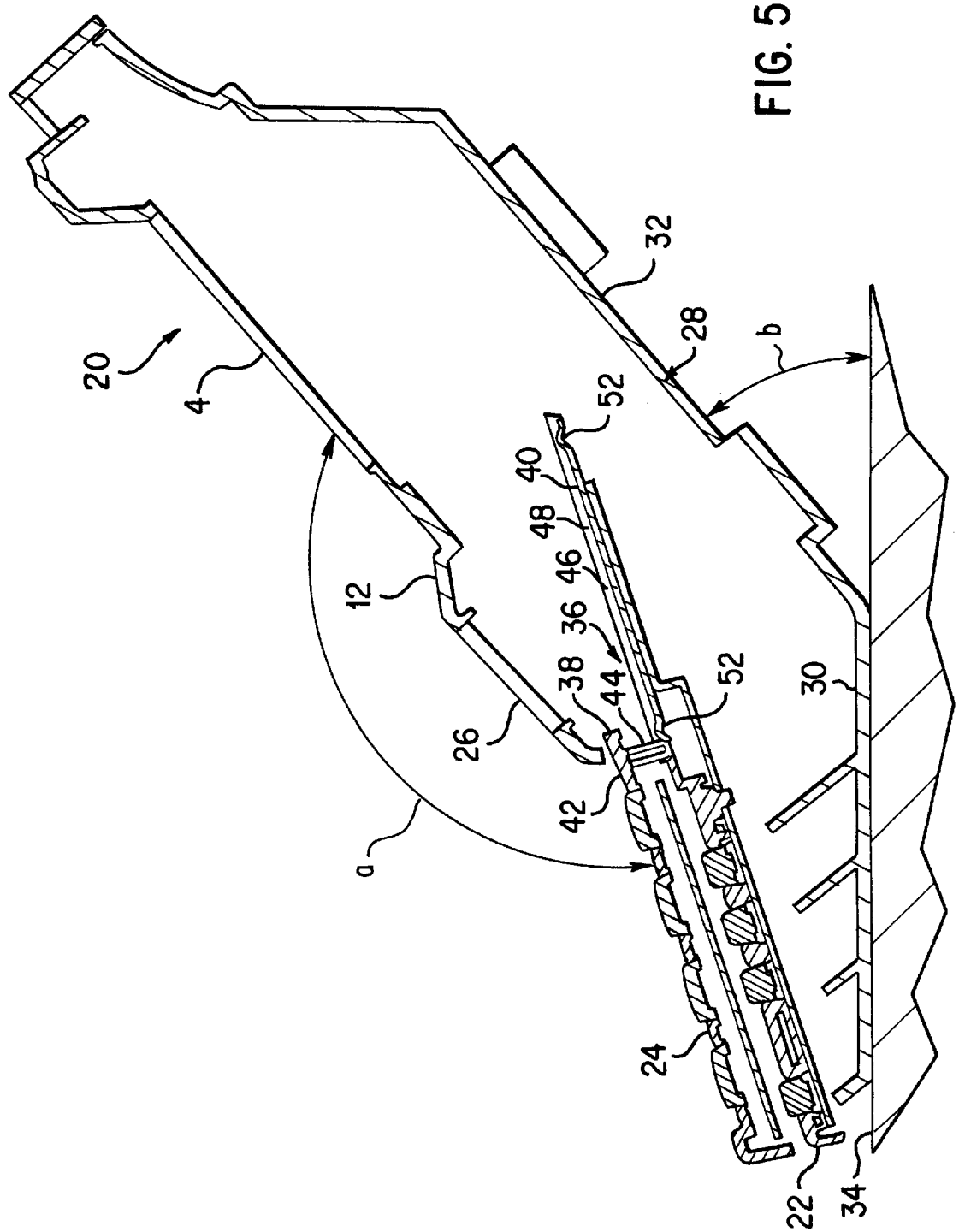
FIG. 5 is a cross-sectional elevational view of the communications apparatus of FIG. 4 illustrating the second keypad device covering the first keypad device.

A first embodiment of a communications apparatus 20 of the invention is generally introduced in FIGS. 2–5. The communications apparatus 20 of the invention includes a first keypad device 22 as shown in FIGS. 2, 3 and 5, and a second keypad device 24 as shown in FIGS. 3–5. Although not by way of limitation, the first keypad device 22 is a conventional full keyboard for typing e-mail and other information and the second keypad device 24 includes a conventional telephone keypad. The keypads could be reversed or specialized keypads could be substituted for one or both of the described exemplary keypads. Similar to the conventional communications device 2 in FIGS. 1A and 1B, the communications apparatus 20 of the invention includes the display 4, the telephone handset unit 6 and the housing 12. Also, a cursor control device 26 is positioned below the display 4.

The first keypad device 22 is immovably disposed relative to the housing 12 and the display 4. The second keypad device 24 is operative to move to and between a retracted state as shown in FIGS. 2 and 3 and an exposed state as shown in FIGS. 4 and 5. In the retracted stated, the second keypad device 24 is stowed within the housing 12 so that the first keypad device 22 is accessible to a user for typing e-mail and other information, while the second keypad device 24 is inaccessible to the user. In the exposed state, the first keypad device 22 is covered by the second keypad device 24 so that the second keypad device 24 is accessible to the user for dialing telephone numbers and activating telephone functions while the first keypad device 22 is inaccessible to the user. When the second keypad device 24 is in the exposed state, the first keypad device 22 is covered by the second keypad device 24. When the second keypad device 24 is in the retracted state, the first keypad device 22 is uncovered.

The second keypad device 24 slides relative to and over the first keypad device 22 as the second keypad device 24 moves to and between the exposed state and the retracted state. As shown in FIGS. 3 and 5, the first keypad device 22 as well as the second keypad device 24 are oriented at an obtuse angle "a" (about 140°) relative to the display 4 and are mounted to a mounting structure 27 secured within the housing 12. Also, the communications apparatus 20 of the invention includes a base structure 28. As shown in FIGS. 3 and 5, the base structure 28 has a first panel 30 and a second panel 32 that is connected to the first panel 30 at an acute angle "b" (about 140°) relative to the first panel 30. Both the first panel 30 and the second panel 32 are sized to support the communications apparatus 20 of the invention on a substantially flat support surface. In FIGS. 3 and 5, the communications apparatus 20 is supported by the first panel 30 on a horizontal support surface 34. As a result, gravity acts on the second keypad device 24 urging the second keypad device 24 into the exposed state. Both the first and second keypad devices 22, 24 are mounted on the mounting structure at an acute angle (about 20°) relative to the first panel 30.

Figure 6:
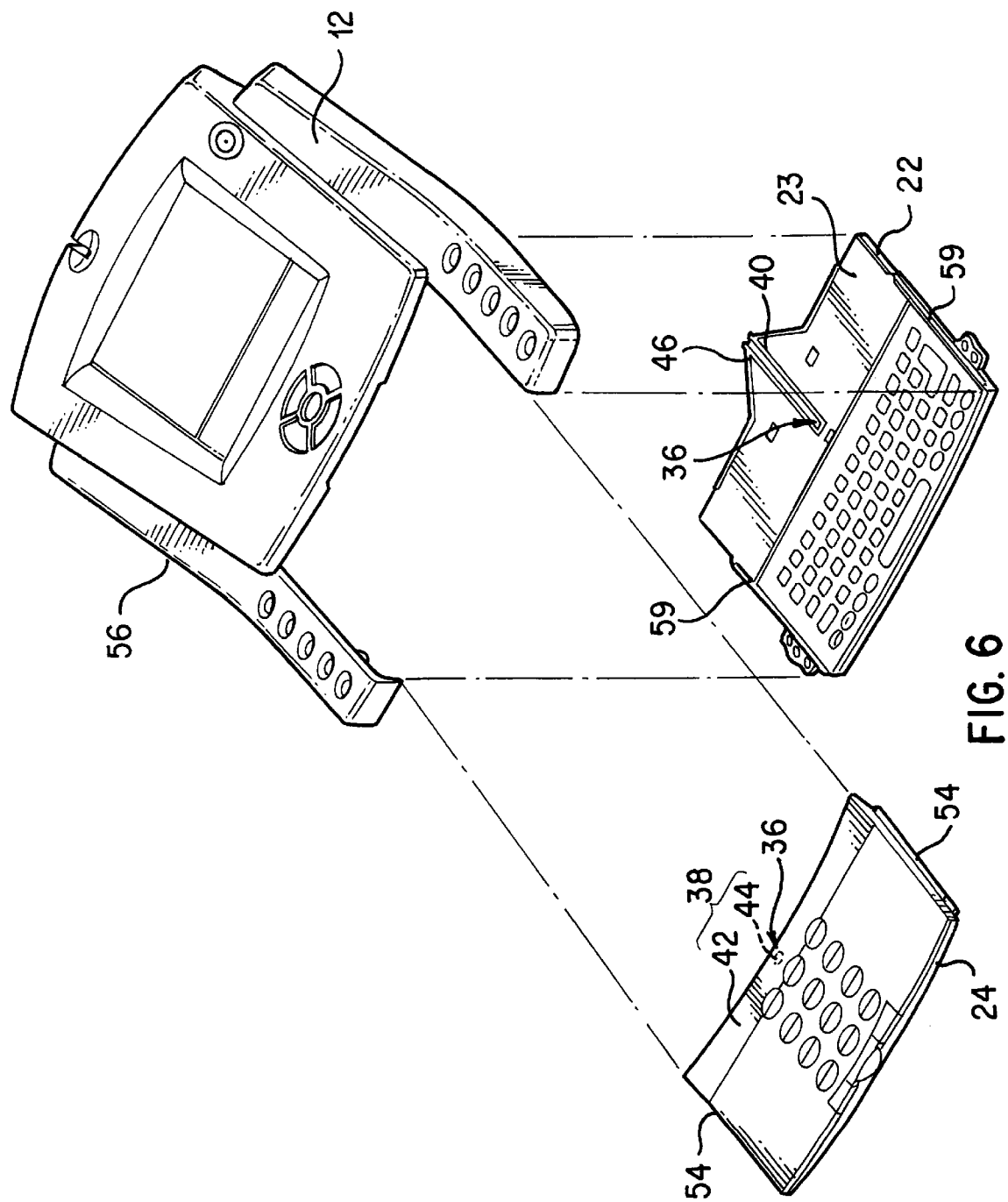
FIG. 6 is an exploded perspective view of a cover, the first keypad device and the second keypad device of the communications apparatus of the invention.
Figure 7:
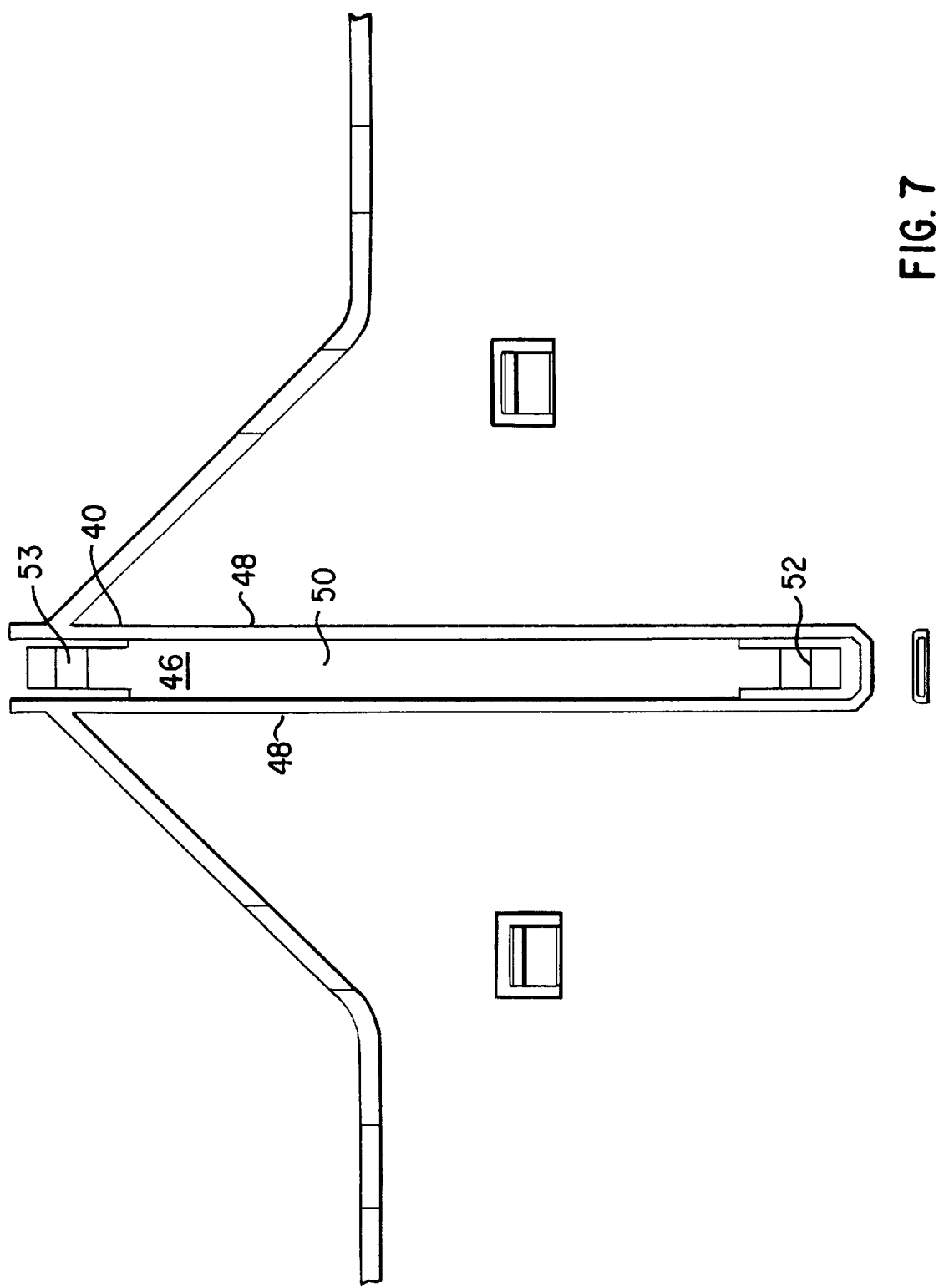
FIG. 7 is a partial planar view of a channel member for the communications apparatus of the invention.

To retain the second keypad device 24 in a selected one of the retracted state or the exposed state, the communications apparatus 20 of the invention includes a retainer mechanism 36. The retainer mechanism 36 releasably retains the second keypad device 24 in either the retracted state or the exposed state. As shown in FIGS. 3 and 5–7, the retainer mechanism 36 of the first embodiment of the communications apparatus 20 of the invention includes a guide member 38 and a channel member 40. The guide member 38 is connected to the second keypad device 24. Specifically, one end of a top portion 42 is connected to the second keypad device 24. The guide member 38 also has a tab portion 44 that extends downwardly from the top portion 42. The channel member 40 is disposed on an extended portion 23 of the first keypad device 22, is connected to the mounting structure 27 and forms a channel 46 as best shown in FIG. 6.

The channel 46 is sized to slidably receive the tab portion 44 of the guide member 38 so that the guide member 38 can slide within and along the channel 46. The channel 46 is defined by a pair of oppositely disposed sidewalls 48 and a bottom wall 50. The bottom wall 50 includes a first protuberance 52 and a second protuberance 53. The protuberances 52, 53 are disposed oppositely of one another within the channel 46. The guide member 38 resiliently contacts at least the protuberances 52 and 53, when the second keypad device 24 moves to and between the exposed state and the retracted state. As shown in FIG. 3, the tab portion 44 is disposed adjacent and above the protuberance 53 with the second keypad device 24 being in the retracted state. The second protuberance 53 is resiliently engaged with the tab portion 44. The retainer mechanism 36 releasably retains the second keypad device 24 in the retracted state. In FIG. 5, the tab portion 44 of the guide member 38 is disposed adjacent and below the first protuberance 52. The first protuberance 52 is resiliently engaged with the tab portion 44. In this instance, the retainer mechanism 36 inhibits movement of the second keypad device 24 which is in the exposed state to move to the retracted state.

Figure 8:
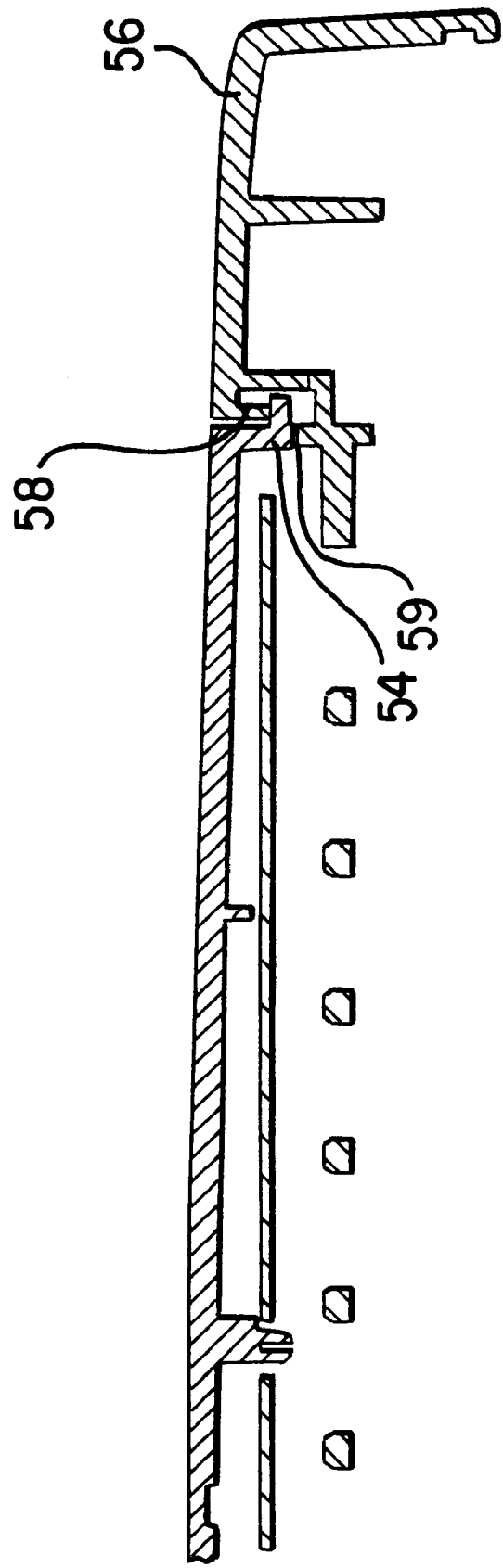
FIG. 8 is a cross-sectional view illustrating the second keypad device slidable between the cover and the first keypad device.

Additionally, one of ordinary skill in the art would appreciate that the retainer mechanism 36 also assists in guiding the second keypad device 24 as the second keyboard device 24 moves to and between the exposed state and the retracted state. As shown in FIGS. 6 and 8, the second keypad device 24 includes a pair of oppositely disposed flanges 54 that are matably received by respective ones of longitudinally extending notches 58 that are formed facing each other in the cover 56. Upon assembly of the first keypad device 22, the second keypad device 24 and the cover 56, the second keypad device 24, as shown in FIG. 8, slides on a slide portion 59 of the first keypad device 22 and, in particular, slides between the first keypad device 22 and the cover 56 of the housing 12.

Figure 9:
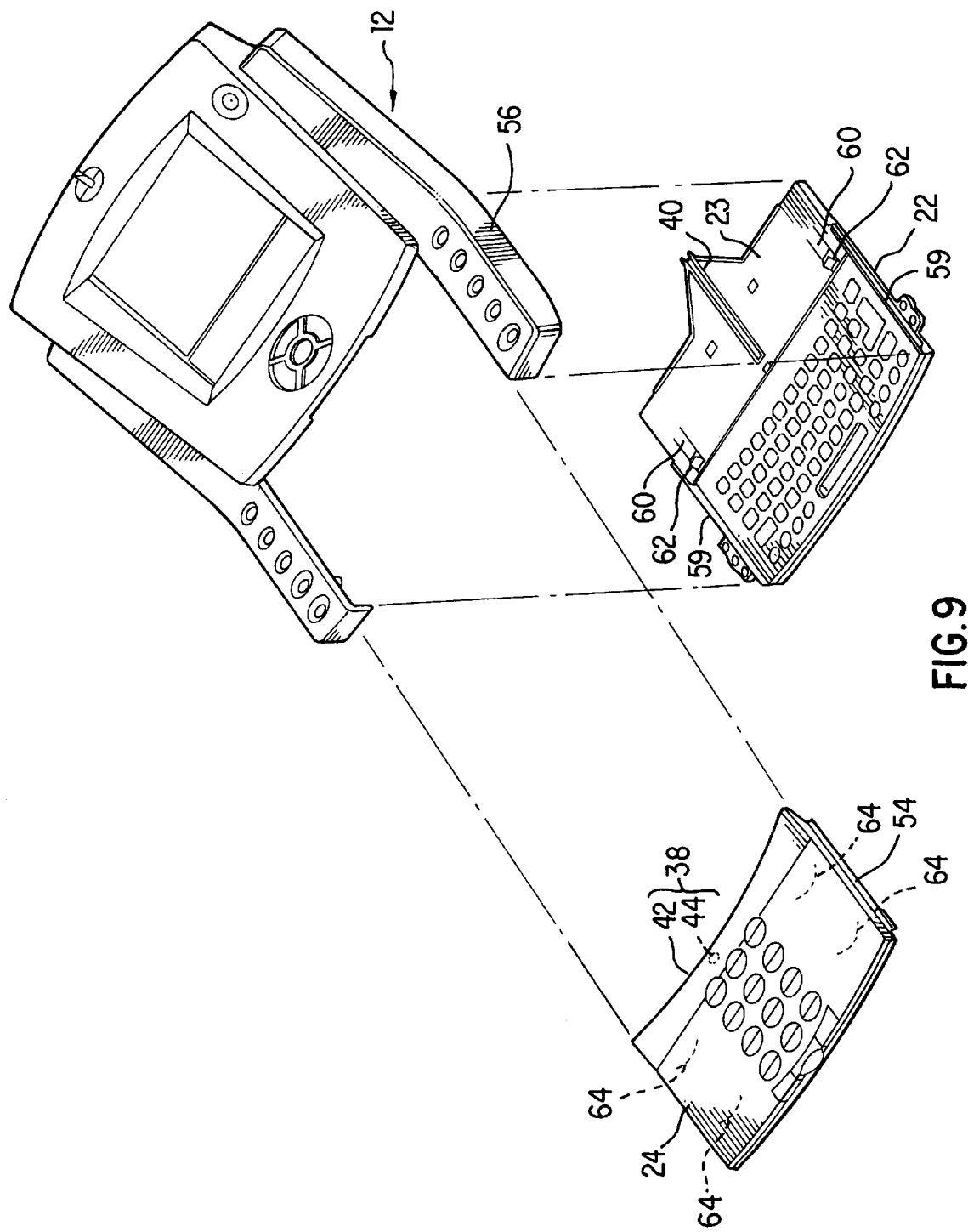
FIG. 9 is an exploded perspective view of the cover, the first keypad device and the second keypad device illustrating a retainer mechanism having a pair of living hinges.
Figure 10:
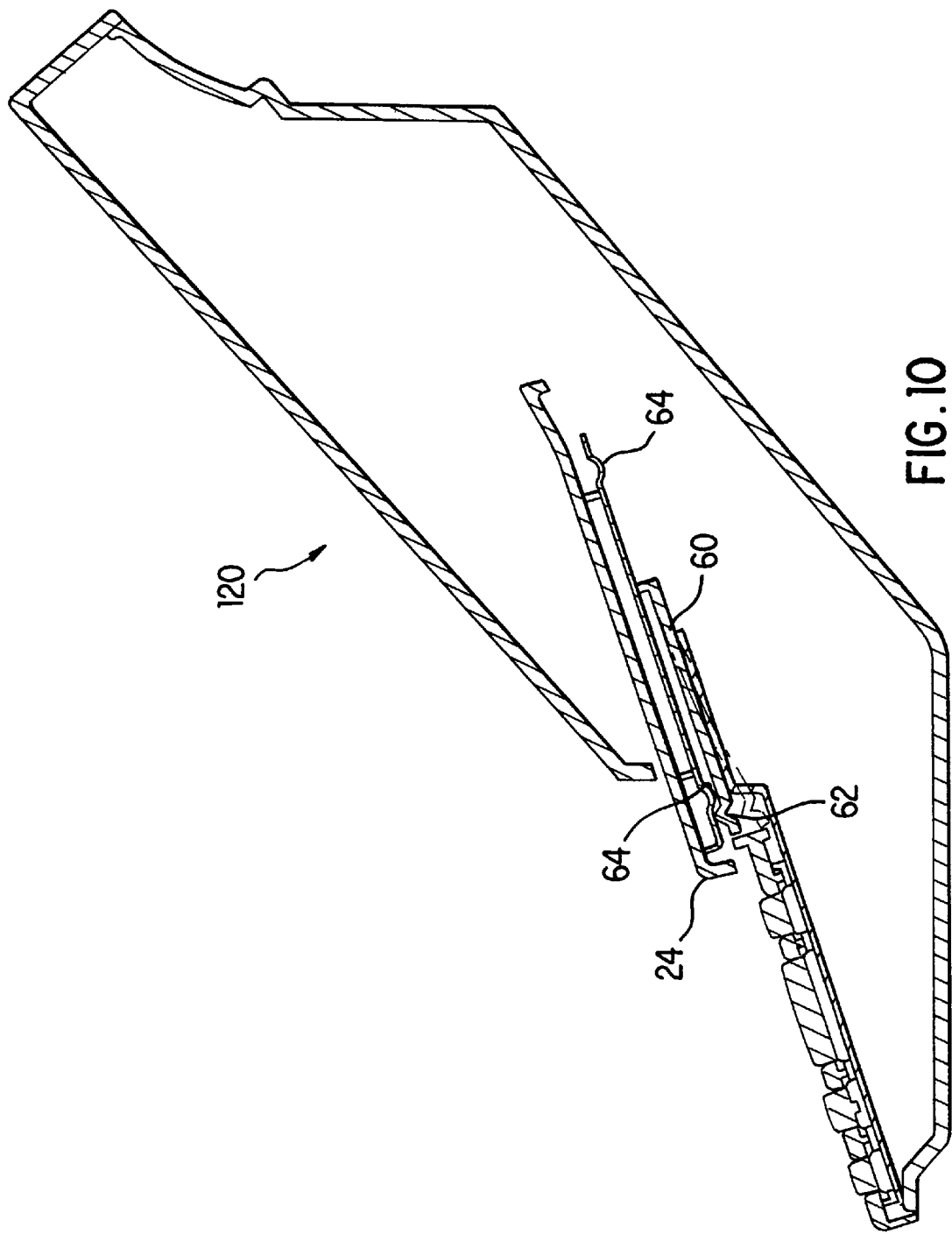
FIG. 10 is a cross-sectional elevational view of the communications apparatus of the invention with the second keypad device in the retracted state.
Figure 11:
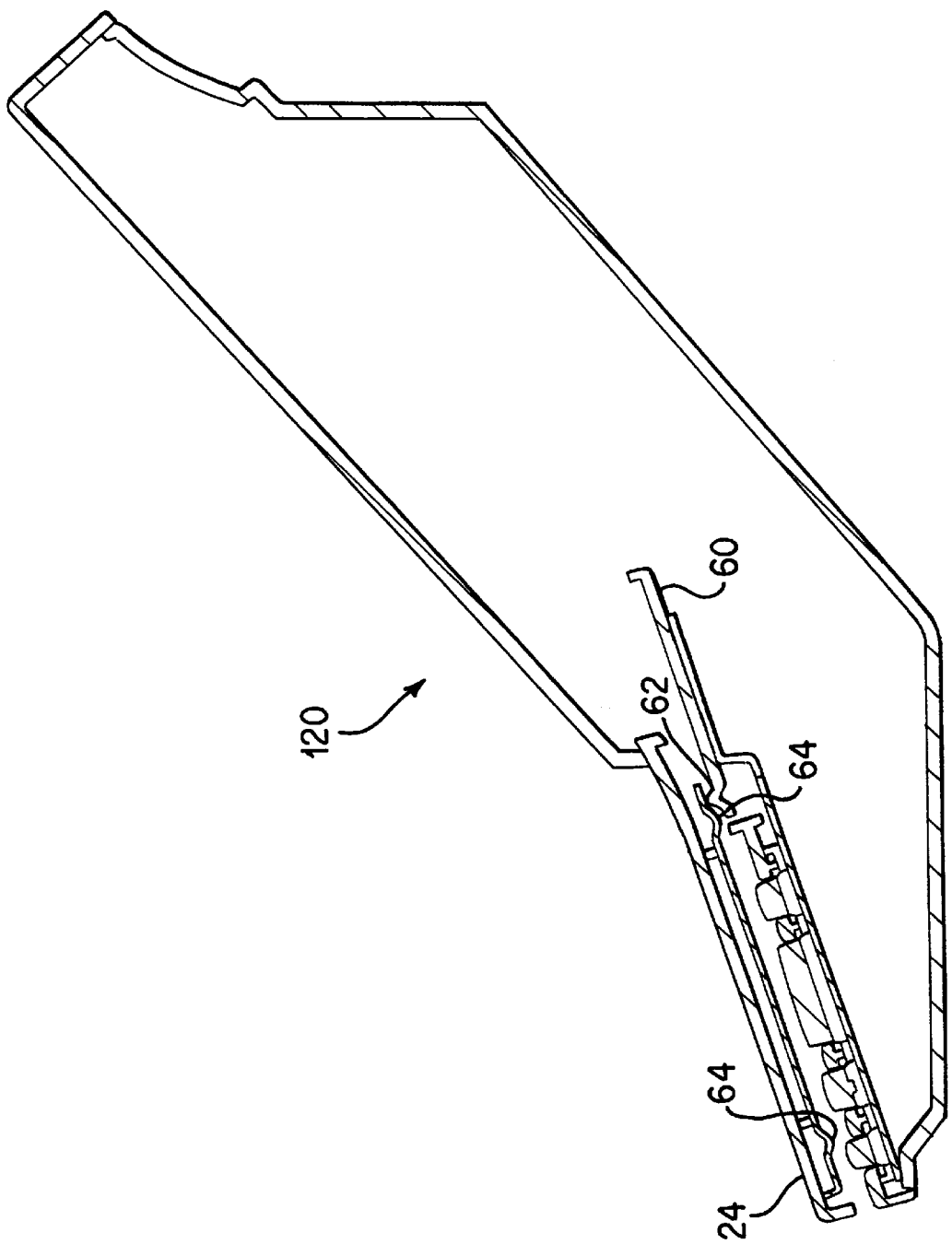
FIG. 11 is a cross-sectional elevational view of the communications apparatus of the invention with the second keypad device in the exposed state.

A second embodiment of a communications apparatus 120 is introduced in FIGS. 9–11. For the second embodiment of the communications apparatus 120 of the invention, a retainer mechanism 136 includes a pair of living hinges 60. Each living hinge 60 includes a detent 62. Correspondingly, the second keypad device 24 includes two pairs of projecting elements 64 that project from a bottom of the second keypad device 24. One skilled in the art would appreciate that the pair of living hinges 60 are capable of flexing as illustrated by the dashed lines in FIG. 10. Further, a skilled artisan would appreciate that in FIG. 10, the detent 62 adjacent the projecting element 64 releasably retains the second keypad device 24 in the retracted state. Also, a skilled artisan would appreciate that in FIG. 11, the detent 62 releasably retains the second keypad device 24 in the exposed state. With the pair of living hinges 60 and the two pairs of projecting elements 64, the channel member 40 may or may not include the protuberances 52, 53.

Because the living hinges 60 and detents 62 operate in cooperation with the projecting elements 64 to retain the second keypad device 24 in either the retracted state or the exposed state, it is preferred that the channel 40 not include the protuberances 52, 53. Thus, the tab portion 44 of the guide member 38 slides within and along the channel 46 for purposes of guiding the second keypad device 24 to and between the retracted state and the exposed state without providing the function of retaining the second keypad device 24 in either the exposed state or retracted state.

Figure 12:
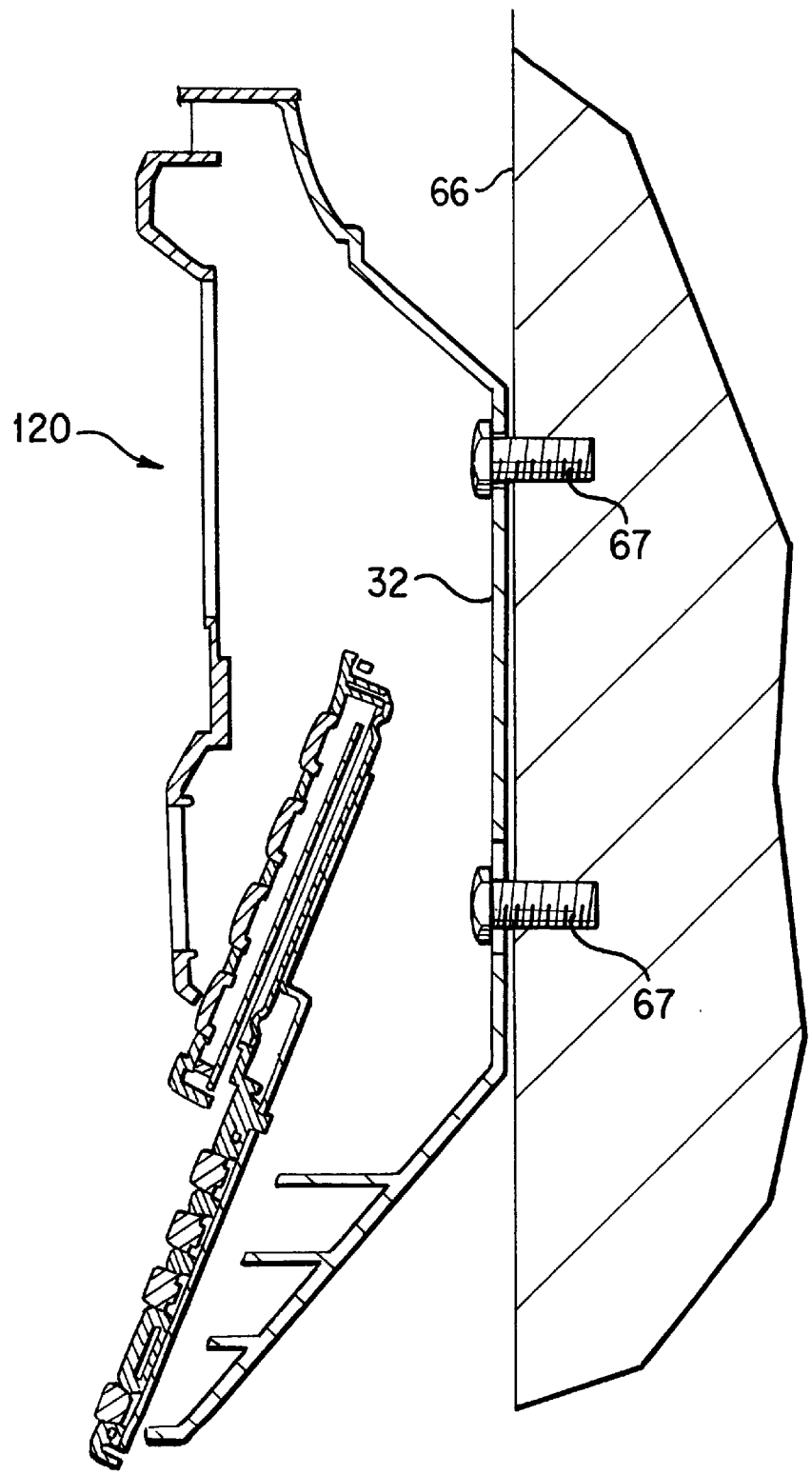
FIG. 12 is an elevational view of the communications apparatus of the invention mounted on a vertical support surface.

Although not by way of limitation, the second embodiment of the communications apparatus 120 in FIG. 12 is shown mounted to a vertical support structure 66 by conventional fasteners 67 such as screws. Specifically, the second panel 32 is in facial registration with the vertical support structure 66 and is mounted thereto by any conventional mounting means.

Figure 13:
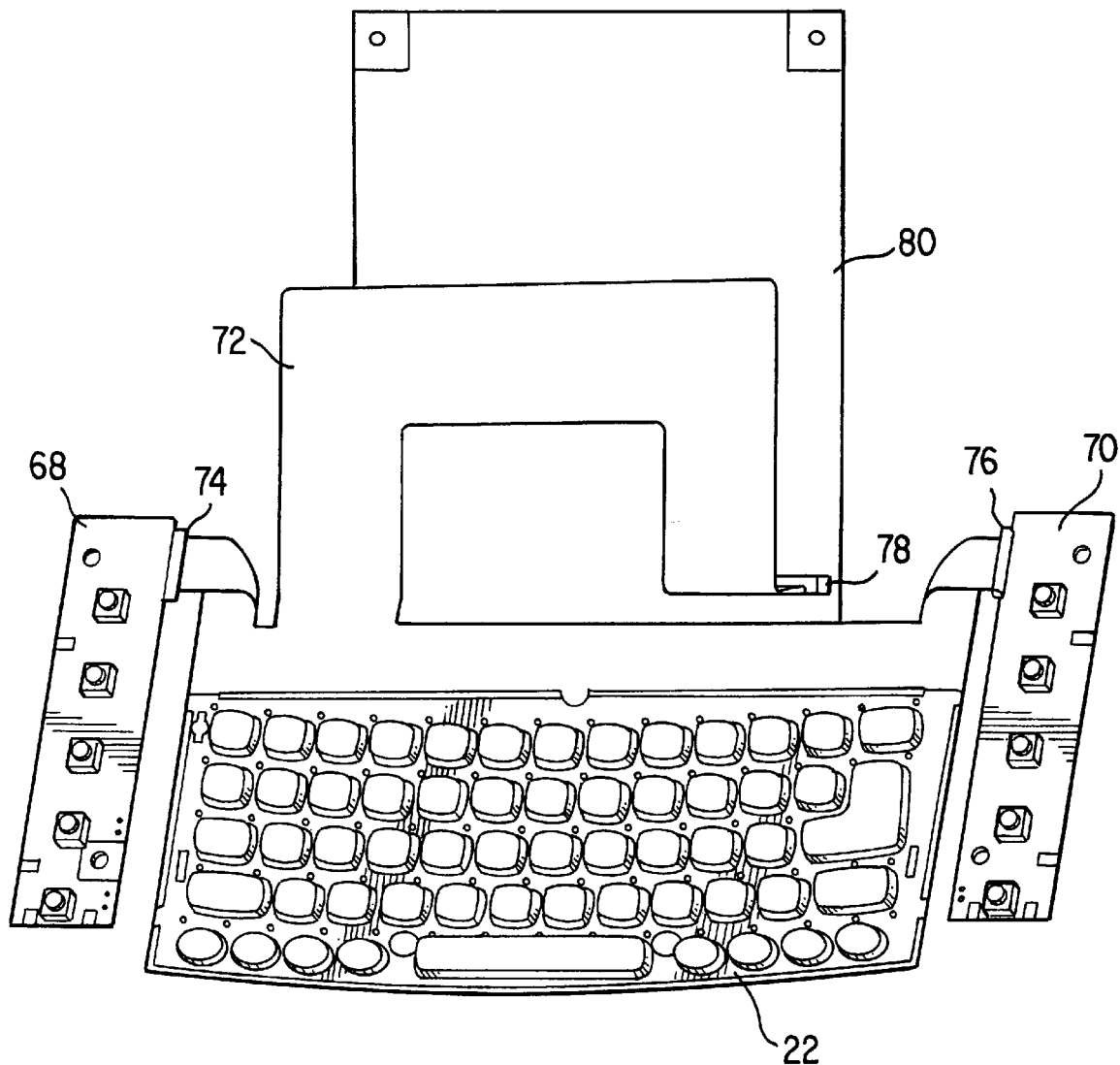
FIG. 13 is a planar view of the communications apparatus of the invention illustrating several internal components.
Figure 14:
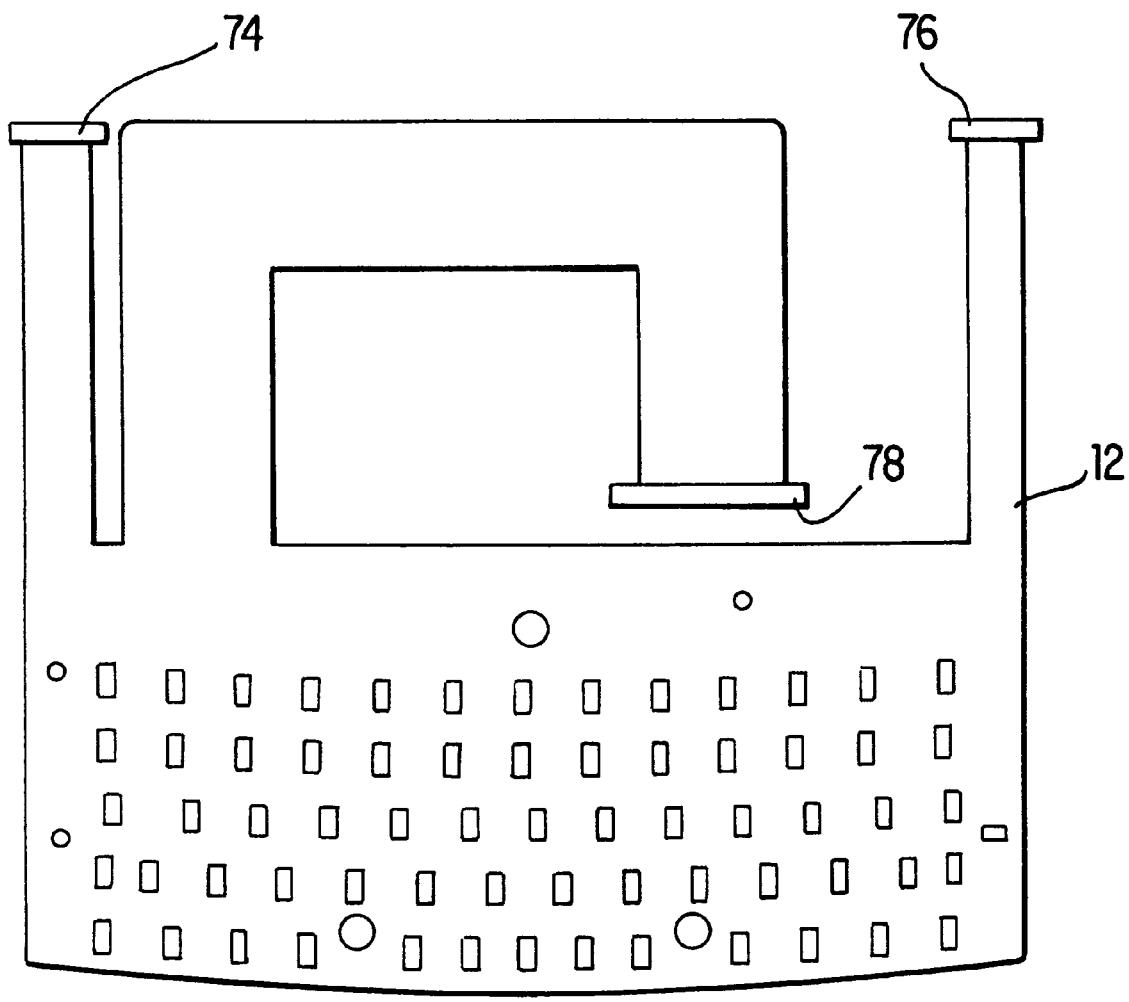
FIG. 14 is a planar view of a function printed circuit board used in the communications apparatus of the invention.

As shown in FIGS. 2 and 4, the communications apparatus of the invention includes a third keypad device 68 and a fourth keypad device 70 with the first keypad device 22 being positioned between the third and fourth keypad devices 68 and 70, respectively. Although not by way of limitation, the third keypad device 68 and the fourth keypad device 70 are used to activate specific functions of the communications apparatus of the invention. In FIG. 13, the first keyboard device 22 is connected to the third and fourth keypad devices 68 and 70 by a function printed circuit board 72. In FIG. 14, the fluction printed circuit board 72 is illustrated without the first keypad device 22 mounted thereto. Again, with reference to FIG. 13, the function printed circuit board 72 is operably connected to the first keypad device 22 and includes a first connector 74 that connects the function printed circuit board 72 to the third keypad device 68. Further, the function printed circuit board 72 includes a second connector 76 that connects the function printed circuit board 72 to the fourth keypad device 70. Also, the function printed circuit board 72 includes a third connector 78 that connects the function printed circuit board 72 to a main printed circuit board 80 of the communications apparatus of the invention. The function printed circuit board 72 helps to facilitate ease of assembly of the communications apparatus of the invention.

It is appreciated that the communications apparatus of the invention includes a fixed keypad device and a retractable keypad device that can be retracted from the housing without occupying any additional space on a support surface. Also, the communications apparatus of the invention is designed to be placed on either a flat horizontal support surface, on a flat vertical support surface, or any angle in between.

The invention has been described with particularity in connection with the embodiments of the invention. However, it should be appreciated that changes may be made to the embodiments of the invention without departing from the spirit and inventive concepts contained herein.

What is claimed is:

1. A communications apparatus including a housing, comprising:
   a first keypad device immovably disposed relative to the housing; and
   a second keypad device operative for moving to and between an exposed state wherein the second keypad device is accessible to a user while the first keypad device is inaccessible to the user, and a retracted state wherein the second keypad device is inaccessible to the user while the first keypad device is accessible to the user, the second keypad device being substantially disposed within the housing when in the retracted state.

2. A communications apparatus according to claim 1, wherein, when the second keypad device is in the exposed state, the first keypad device is covered by the second keypad device.

3. A communications apparatus according to claim 2, wherein, when the second keypad device is in the retracted state, the second keypad device is stowed within the housing and the first keypad device is uncovered.

4. A communications apparatus according to claim 1, further comprising a retainer mechanism for releasably retaining the second keypad device in at least one of the retracted state and the exposed state.

5. A communications apparatus according to claim 4, wherein the retainer mechanism is disposed within the housing and includes at least one living hinge having a detent formed thereon wherein the detent contacts the second keypad device.

6. A communications apparatus according to claim 4, wherein the retainer mechanism includes a guide member connected to the second keypad device and a channel member disposed within the housing and forming a channel sized to slidably receive the guide member, the channel defined by a pair of oppositely disposed side walls and a bottom wall having a pair of oppositely disposed protuberances projecting from the bottom wall, the guide member resiliently biased into the channel to contact at least the protuberances when the second keypad device moves to and between the exposed state and the retracted state.

7. A communications apparatus according to claim 1, wherein the second keypad device slides relative to the first keypad device when moving to and between the exposed state and the retracted state.

8. A communications apparatus according to claim 7, wherein the second keypad device slides on the first keypad device.

9. A communications apparatus according to claim 8, wherein the second keypad device slides between the first keypad device and the housing.

10. A communications apparatus according to claim 1, further comprising a third keypad device and a fourth keypad device with the first keypad device disposed between the third and fourth keypad devices.

11. A communications apparatus according to claim 10, further comprising a function printed circuit board operably connected to the first keypad device and including a first connector for connecting the function printed circuit board to the third keypad device, a second connector for connecting the function printed circuit board to the fourth keypad device and a third connector for connecting the function printed circuit board to a main printed circuit board of the communications apparatus.

12. A communications apparatus according to claim 1, further comprising a base structure having a first panel and a second panel connected to the first panel at an acute angle relative to the first panel, the first panel and the second panel sized to support the communications apparatus on a substantially flat support surface.

13. A communications apparatus according to claim 12, wherein the first panel is sized and adapted to support the communications apparatus on a horizontal support surface and the second panel is sized and adapted for mounting the communications apparatus onto a vertical support surface.

14. A communications apparatus according to claim 1 further comprising a display.

15. A communications apparatus according to claim 14, wherein at least one of the first keypad device and the second keypad device is oriented at an obtuse angle relative to the display.

* * * * *